US012753677B2

(12) United States Patent
Brandsæter et al.

(10) Patent No.: US 12,753,677 B2
(45) Date of Patent: Oct. 6, 2026

(54) ASSEMBLY FOR GENERATING ELECTRICITY IN A PRODUCTION WELL OF A HOT FLUID

(71) Applicant: AFFIN AS, Notodden (NO)

(72) Inventors: Helge Brandsæter, Hamresanden (NO); Harald Furu, Oslo (NO)

(73) Assignee: AFFIN AS, Notodden (NO)

(*) Notice: Subject to any disclaimer, the term of this patent is extended or adjusted under 35 U.S.C. 154(b) by 0 days.

(21) Appl. No.: 18/850,180

(22) PCT Filed: Mar. 27, 2023

(86) PCT No.: PCT/EP2023/057838
§ 371 (c)(1),
(2) Date: Sep. 24, 2024

(87) PCT Pub. No.: WO2023/186803
PCT Pub. Date: Oct. 5, 2023

(65) Prior Publication Data

US 2025/0207481 A1 Jun. 26, 2025

(30) Foreign Application Priority Data

Mar. 28, 2022 (NO) .................................... 20220367

(51) Int. Cl.
*E21B 41/00* (2006.01)
*F03G 4/02* (2006.01)

(52) U.S. Cl.
CPC ............ *E21B 41/0085* (2013.01); *F03G 4/02* (2021.08)

(58) Field of Classification Search
CPC ....... E21B 36/001; E21B 41/0085; F03G 4/02
See application file for complete search history.

(56) References Cited

U.S. PATENT DOCUMENTS 5,860,476 A 1/1999 Kjos
6,000,471 A 12/1999 Langset
(Continued)

FOREIGN PATENT DOCUMENTS

CN 108756821 11/2018
GB 2549558 10/2017
GB 2589393 6/2021

OTHER PUBLICATIONS

International Search Report Issued in PCT/EP2023/057838, Nov. 7, 2023, pp. 1-2.
(Continued)

*Primary Examiner* — Brad Harcourt
(74) *Attorney, Agent, or Firm* — Jeffrey S. Melcher; Melcher Patent Law PLLC

(57) ABSTRACT

The present application is related to an assembly for generating electricity in a production well of a hot fluid, the hot fluid being water, oil or gas, the production well comprising: •—a casing; •—a production tubing, comprising an inner side and an outer side, the production tubing: • being housed in the casing; • being adapted to transport hot fluid from a collecting downhole location of the well to an outer part of the well in respect to the collecting downhole location, and • wherein between the production tubing and the casing there is an inner space configured to house a cold fluid; •—a barrier between the production tubing and the casing to fluidically separate the inner space and the interior space housed by the casing at a collecting downhole location; •—at least one thermoelectric means comprising a hot side and a cold side, wherein the thermoelectric means are configured to generate electricity when the hot side is in thermal contact with a hot source and the cold side is in contact with a cold source, the hot side of the at least one thermoelectric means, in operative mode, is thermally connected to the hot fluid transported by the production tubing
(Continued)

and the cold side is thermally connected to the cold fluid of the inner space, and •—an electrical conductor connected to the at least one thermoelectric means for transporting the generated electricity to at least an outer part of the well.

21 Claims, 6 Drawing Sheets

(56) References Cited

U.S. PATENT DOCUMENTS

| | | | | |
|---|---|---|---|---|
| 6,132,494 | A | 10/2000 | Kjos | |
| 6,150,601 | A | 11/2000 | Schatzmeyer | |
| 6,543,537 | B1 | 4/2003 | Kjos | |
| 8,616,000 | B2 | 12/2013 | Parrella | |
| 11,319,779 | B1 * | 5/2022 | Bryan | H10N 10/17 |
| 12,078,033 | B2 * | 9/2024 | Till | E21B 41/0085 |
| 2007/0151591 | A1 | 7/2007 | Jefferys | |
| 2009/0217960 | A1 * | 9/2009 | Tubel | H10N 10/13 136/205 |
| 2012/0174581 | A1 | 7/2012 | Vaughan | |
| 2013/0014797 | A1 * | 1/2013 | Ellson | E21B 41/0007 136/205 |
| 2017/0107795 | A1 * | 4/2017 | Yeo | E21B 41/0085 |
| 2017/0321544 | A1 * | 11/2017 | Wilson | E21B 47/135 |
| 2018/0202288 | A1 * | 7/2018 | Elbadawy | E21B 7/007 |
| 2021/0054700 | A1 * | 2/2021 | Basile | E21B 19/14 |
| 2022/0205348 | A1 * | 6/2022 | Thompson | E21B 43/00 |

OTHER PUBLICATIONS

Written Opinion Issued in PCT/EP2023/057838, Nov. 7, 2023, pp. 1-6.

International Search Report Issued in PCT/NO2023/050020, Mar. 28, 2023, pp. 1-2.

Written Opinion Issued in PPCT/NO2023/050020, Mar. 28, 2023, pp. 1-6.

Assessment of Deep Geothermal Energy Exploitation Met; the Need for Novel Single-Well Solutions, Falcone, G., Liu, X., Okech, R.R., Seyidov, F., Teodoriu.C. Energy, vol. 160, Issue Oct. 2018, pp. 54-63.

* cited by examiner

ASSEMBLY FOR GENERATING ELECTRICITY IN A PRODUCTION WELL OF A HOT FLUID

FIELD OF THE INVENTION

The present invention is related to an assembly for the production of electricity in a production or abandoned water and/or oil and/or gas wells using thermoelectric effects and to the method thereof. In particular, the electricity produced by the invention has no impact on the environment using the heat potential of deep wells.

PRIOR ART

As of today, awareness towards green energy sources is raising. Actually, the focus on exploitation of said energy sources has increased significantly as the impact of $CO_2$ and fossil fuels are better understood. At the same time, MIT scientists claim that more than two-thirds of energy used worldwide is ultimately ejected as “waste heat”. That is why, re-utilization of a fraction of this wasted energy could increase the supply of green energy significantly with small or zero impact on the environment. Nevertheless, the available investments for implementing green energy sources are limited, providing an improved route to a greener society.

Volcanic areas, such as Iceland, have provided the advantage of easy availability to hot water from the subsurface supplying most of its electricity from such sources. Thanks to the temperature gradient with depth is depending on geologic conditions and is showing higher temperatures in shallower layers, mostly in volcanic active areas. These high temperature zones are being exploited by drilling geothermal well producing hot water and resulting in generating electricity. Since the drilling of wells has an expensive implementation, the cost is, at that time, limiting the exploitation of geothermal energy.

However, less obvious is the heat resources represented by wells drilled for oil and gas exploration and production. In that particular case, the cost of the wells is already “paid for” since it is implemented for other purposes and the heat resource of the surrounding formations represents an untapped resource up to day.

Production wells are designed to bring water and/or oil and/or gas to the surface. In the particular case of oil well, most of the time, some natural gas is also released while the oil is being extracted. Production wells in general are created by drilling down into an oil and/or gas reserve that is later mounted with an extraction device known as pump jack which allows the extraction step of oil and/or gas from the reserve when onshore. When applied to a production well offshore, natural pressure or injection of water and/or gas are usually options that allows the extraction step from the reserve. Particularly, a well is commonly drilled using an increasingly complex array of tools and know-how and then brought to life through completion activities.

Traditionally, production wells are vertical wells when utilized for extracting oil and/or gas from a subsurface reservoir. However, horizontal drilling was later developed in order to extract oil and gas from multiple reservoirs while using only one well, horizontally positioned into the deposit. Once the production well is drilled, a technique which consist of injecting a mixture of water, sand and chemicals at a high pressure to fracture the rock and bring the oil and/or gas to the surface. It is well known that high temperatures are encountered during the drilling process of production wells and that these temperatures affect every aspect of the drilling.

In particular, known temperatures in oil and gas reservoir are most commonly in the range between 70° C. and 130° C. in the North Sea, and up to 170-180° C. in the Norwegian Sea. The amount of energy that can be retrieved using conventional techniques is a function of water-volume to surface per unit time and temperature of the water. It is often claimed that efficient production of electricity generally requires a temperature above 120° C.

The conventional geothermal applications includes well known technologies using hot water to drive an Organic Ranking Cycle (ORC) system. The main known drawback of said technology being the needed high input temperature of the water and the cost of drilling a dedicated well.

Newer innovation in the material field, such as thermoelectric materials, show potential to help bring geothermal applications a quantum step forward. Thermoelectric devices are based on properties of specific materials which generate electricity if exposed to a temperature difference between a hot side and a cold side of the thermoelectric material. Particularly, the efficiency of said thermoelectric materials depends on the temperature difference between the warm and cold side of these materials. However, it has been proved that even a limited temperature difference, such as a 10° C. difference, generates a significant amount of energy given that the surface of the thermoelectric material is large enough. The thermoelectric materials have been, so far, mostly applied in the space industry and relatively limited in other fields.

Therefore, there is a need in the art for a system capable of providing simultaneous production of electricity and production of oil and/or gas from one single well in environment where there is no need of high temperature. Additionally, the system should have no impact on the environment and the cost of implementing said technology would be small compared to the drilling costs of a well.

Document CN108756821A describes an invention which belongs to the technical field of geothermal power generation, it particularly relates to an oil well underground thermal power generation system and method.

Document GB2589393 A discloses an invention relates to downhole energy harvesting.

Document US2007/151591A1 describes methods and system for providing electric power in a wellbore including at least one thermoelectric generator at a downhole location; and one or more thermally insulated sections of wellbore tubing located such as to reduce heat loss of fluid flowing through the wellbore from the entry point of the fluid to the location of the generator.

Document U.S. Pat. No. 6,150,601A discloses an invention relating to a method and apparatus for generating electric power in a downhole environment, and in particular to a method and apparatus for generating electric power using a thermoelectric device by converting a downhole temperature gradient into electric power.

DESCRIPTION OF THE INVENTION

The present invention provides a solution for the above mentioned issues by an assembly for generating electricity in a production well of a hot fluid according to independent claim 1, a method for generating electricity in a production well of a hot fluid according to independent claim 19. In dependent claims, preferred embodiments of the invention are defined.

In a first inventive aspect, the present invention provides an assembly for generating electricity in a production well of a hot fluid, the hot fluid being water and/or oil and/or gas, the production well comprising:

- a casing;
- a production tubing, comprising an inner side and an outer side, the production tubing:
  - being housed in the casing;
  - being adapted to transport hot fluid from a collecting downhole location of the production well to an outer part of the well in respect to the collecting downhole location, and
  - wherein between the production tubing and the casing there is an inner space configured to house a cold fluid;
- a barrier between the production tubing and the casing to fluidically separate the inner space and the interior space housed by the casing at a collecting downhole location;
- at least one thermoelectric means comprising a hot side and a cold side, wherein the thermoelectric means are configured to generate electricity when the hot side is in thermal contact with a hot source and the cold side is in thermal contact with a cold source, the hot side of the at least one thermoelectric means, in operative mode, is thermally connected to the hot fluid transported by the production tubing and the cold side is thermally connected to the cold fluid of the inner space, and
- an electrical conductor connected to the at least one thermoelectric means for transporting the generated electricity to at least an outer part of the well.

Throughout the whole document, it is considered a standard production well of hot fluid, such as water and/or oil and/or gas, comprising an outer tube called casing and an inner tube called production tubing. First, the casing is run and cemented in a pre-drilled well. Then, the production tubing is also run into the drilled well, but also, into the casing. Advantageously, the production tubing helps protecting the wellbore casing from corrosion, wear, tear and deposition due to the product running inside the well. Also, the casing provides stabilization to the wellbore and must be able to withstand high loads.

The production tubing is adapted to transport hot fluid from deep in the well to an outer part of the well, often to the surface, in respect to the collecting downhole location. Particularly, the production tubing presents a smaller diameter than the diameter of the casing in order to create an inner space in between the casing and the production tubing.

The inner space is configured for housing a cold fluid and can extend along the whole depth of the well or, preferably, the inner space houses a cold fluid in a particular region of the well. Also, the inner space, since it is defined in between two tubes, the casing and the production tubing, the inner space presents an area having the shape of a substantially circular hollow cylinder.

The assembly comprises a barrier located between the production tubing and the casing in order to separate the inner space and the interior space housed by the casing at a collection downhole location. The barrier can be either located at the deepest point of the well or at any depth in between the surface and the bottom of the well. Also, the barrier presents a shape of a substantially circular hollow cylinder having a small thickness in comparison to the length of the inner space.

Preferably, the barrier is airtight and/or liquid tight in order to ensure the perfect sealing of the inner space and so that the cold fluid do not escape from said inner space.

The assembly also comprises at least one thermoelectric means, having a hot side and a cold side, configured to generate electricity through the difference of temperature between the hot fluid running into the production tubing and the cold fluid located inside the inner space. The at least one thermoelectric means is in thermal contact with a hot source, that is the hot fluid running inside the production tubing, and the cold side of the at least one thermoelectric means is in thermal contact with a cold source, that is the cold fluid of the inner space.

Preferably, the at least one thermoelectric means is a standard thermoelectric device comprising semiconductors. Advantageously, the present invention provides the ability to produce power even with low difference of temperature between the hot fluid and the cold fluid.

Preferably, the assembly presents a plurality of thermoelectric means connected in series and/or parallel in order to produce the required power, voltage or current. Also, due to the temperature variations along the production tubing and inside the inner space, each thermoelectric means is able to produce its own quantity of power. In particular, the quantity of power produced throughout the thermoelectric means is either equivalently produced in between each of the thermoelectric means or each of the thermoelectric means can produce a different quantity of power.

In some embodiments, the at least one thermoelectric means is a $Bi_2Te_3$.

The assembly also comprises an electrical conductor, preferably a cable, connected to the at least one thermoelectric means and configured for transporting the generated electricity to at least an outer part of the well, more preferably to the surface. Preferably, the electrical conductor is a cable connected to each of the thermoelectric means mounted on the production tubing.

The present invention provides the ability to simultaneously produce electricity and produce hot fluid from one single well. Additionally, the implementation of thermoelectric means do not require high temperatures inside the well but a temperature difference between the hot fluid running into the production tubing and the cold fluid of the inner space.

Advantageously, the present assembly is easy to be incorporated and installed on a standard production well completions.

In a particular embodiment, the assembly further comprises:

- control means configured for monitoring temperature of the cold fluid, and
- cooling means configured for maintaining the cold fluid at a temperature lower than the temperature of the hot fluid wherein the cooling means comprise a plurality of conducts thermally connected to the cold fluid and configured for transporting a fluid.

The assembly further comprises control means which are configured for monitoring the temperature of the cold fluid inside the inner space in order to optimize cooling and set the difference of temperature required for the at least one thermoelectric means to generate power. Also, the control means are configured for providing control of the volume of cooling fluid that is required to circulate in the inner space.

Also, the assembly comprises cooling means configured for maintaining the cold fluid at a lower temperature than the temperature of the hot fluid. The cooling means comprises a plurality of conducts thermally connected to the cold fluid and configured for transporting a fluid inside said plurality of conducts. Preferably, the plurality of conducts is distributed along the whole length of the inner space in order to cool the cold fluid homogeneously.

By providing cooling of the cold fluid of the inner space, the power production, through the at least one thermoelectric means, is increased.

In some other embodiments, improved cooling of the cold fluid can be provided by insulating the production tubing zones that do not present any thermoelectric means.

In a particular embodiment, the fluid transported by the plurality of conducts is cold fluid.

The cold fluid transported by the plurality of conducts is either in direct contact or in thermal contact with the cold source.

In a particular embodiment, the plurality of conducts of the cooling means is an open loop adapted to inject cold fluid to the bottom of the inner space and extract cold fluid at the top of the inner space.

Preferably, the cold fluid injected in the inner space is the same fluid that the fluid which is already present in said inner space.

The cold fluid which is extracted at the top of the inner space presents a temperature which is higher than the cold fluid injected at the bottom of the inner space.

In this particular embodiment, since the fluid is directly injected into the inner space through the plurality of conducts, the injected fluid through the plurality of conduct is cold fluid in order to ensure the homogeneity of temperature of said cold fluid in the inner space and the monitoring of its temperature.

In a particular embodiment, the plurality of conducts of the cooling means is a closed loop adapted to transport a fluid.

The closed loop formed by the plurality of conducts of the cooling means is adapted to transport a fluid and allows consistent cooling of the cold source of the inner space during the operative mode by optimal circulation of the fluid in the inner space. Also, the closed loop provides the ability of carrying cold fluid throughout the whole plurality of conducts which allows a cooling of the cold source lowering the variation of temperature due to the depth variation of the inner space along the well.

In a particular embodiment, the fluid of the plurality of conducts and the cold fluid of the inner space are different fluids.

In the embodiment of the plurality of conducts of the cooling means being a closed loop, the fluid and the cold fluid are different fluid in order to make use of a fluid in the plurality of conducts which provides high capacity of cooling the cold fluid of the inner space.

Preferably, the cold fluid is water and the fluid of the plurality of conducts is seawater where cold seawater is injected in the plurality of conducts and released at the surface.

In a particular embodiment, the cooling means comprises a heat exchanger cooler configured for cooling the fluid of the plurality of conducts before injecting said fluid in the plurality of conducts.

In the particular embodiment of the plurality of conducts of the cooling means being a closed loop, the heat exchange system is placed on the surface in order to cool the fluid before injection into the plurality of conducts.

In a particular embodiment, the cooling means comprises a pump.

The cooling means comprises a pump which provides the ability to inject cold fluid into the plurality of conducts at a required pressure and velocity in order to bring the injected cold fluid back towards the outer part of the well, that is releasing the used fluid at the surface.

In a particular embodiment, the assembly further comprises at least one anchoring means configured to attach the electrical conductor to the outer side of the production tubing.

Preferably, various anchoring means are placed along the production tubing at substantially equal distance in order to run the electrical conductor along the plurality of thermoelectric means and carry on the produced power towards the surface.

In a particular embodiment, the at least one thermoelectric means comprises temperature sensors and/or electrical failure detection sensors.

The temperature sensors provides the ability to monitor, during operative mode, the temperature conditions of the at least one thermoelectric means. At the same time, the electrical failure detection sensors provides the same ability to monitor, the electrical conditions of the at least one thermoelectric means.

In a particular embodiment, the production tubing is partly covered by the at least one thermoelectric means.

Preferably, in the embodiments when the production tubing is partly covered by a plurality of thermoelectric means, said thermoelectric means are mounter at a substantially equal distance one from the other.

In a particular embodiment, the assembly further comprises insulating means located on the outer side of the production tubing in between thermoelectric means.

In a particular embodiment, the production tubing is fully covered by thermoelectric means.

Advantageously, by covering the whole production tubing with thermoelectric means, the present invention makes use of the whole length defined by the inner space for producing the highest quantity of power available.

In a particular embodiment, the at least one thermoelectric means has a semi cylindrical shape.

In this particular embodiment, the at least one thermoelectric means having a semi cylindrical shape ease the installation of said thermoelectric means by reproducing the rounded/cylindrical shape of the production tubing.

In a particular embodiment, the assembly further comprises at least one locking mechanism configured for fastening two of the thermoelectric means around the production tubing.

The at least one locking mechanism is configured for fastening two thermoelectric means around the production tubing when the at least one thermoelectric means has a semi cylindrical shape in order to easily install the thermoelectric elements while running the tube into the well without impacting installation costs or other well functions.

In a particular embodiment, the temperature of the hot fluid is greater than the temperature of the cold fluid, preferably more than 10 degrees Celsius higher.

Advantageously, maintaining the difference of temperatures in the previously mentioned range provides the ability to optimize the production of power from the thermoelectric means.

In a particular embodiment, the at least one thermoelectric means comprises $Bi_2Te_3$ as a semiconductor.

In a particular embodiment, the cold fluid is water, preferably seawater.

In the particular embodiment of the plurality of conducts being a closed loop, the fluid transported inside the conducts is preferably seawater and the cold fluid of the inner space is preferably water.

Additionally, an eventual leak of coolant would end up having no impact on environment.

In a second inventive aspect, the invention provides a method for generating electricity in a production well of a hot fluid, the method comprising:

a) providing an assembly for generating electricity according to any of the preceding claims;

b) mounting said assembly for generating electricity in a production well of a hot fluid comprising a casing previously installed.

Preferably, the assembly is synchronically mounted on the production tubing while said production tubing is being inserted in the drilled well and previously installed casing.

In a particular embodiment, the method further comprises the step of installing, if not present, a casing and a production tubing being housed in the casing wherein the production tubing is extended at least along a path portion of the casing.

In the particular embodiment of a pre-drilled production well do not present the casing and the production tubing previously mounted inside the drilled well, before installing the assembly, these two tube are positioned in such a way that the assembly of the invention is operational to be installed.

In a particular embodiment, the mounting of the thermoelectric means is robotized and synchronized with the running of the completion.

The way that the casing, the production tubing and all pipes implemented while mounting the assembly of the invention are mostly automatized offshore rigs. Additionally, robotizing the mounting of these pipes minimizes the need of personnel on the rig floor which is essential in order to avoid accidents. The same advantages are applicable to the robotized installation of the thermoelectric means which is made gaining time and lowering health and safety risks.

DESCRIPTION OF THE DRAWINGS

These and other features and advantages of the invention will be seen more clearly from the following detailed description of a preferred embodiment provided only by way of illustrative and non-limiting example in reference to the attached drawings.

DETAILED DESCRIPTION OF THE INVENTION

As will be appreciated by one skilled in the art, aspects of the present invention may be embodied as an assembly or method.

Figure 1:
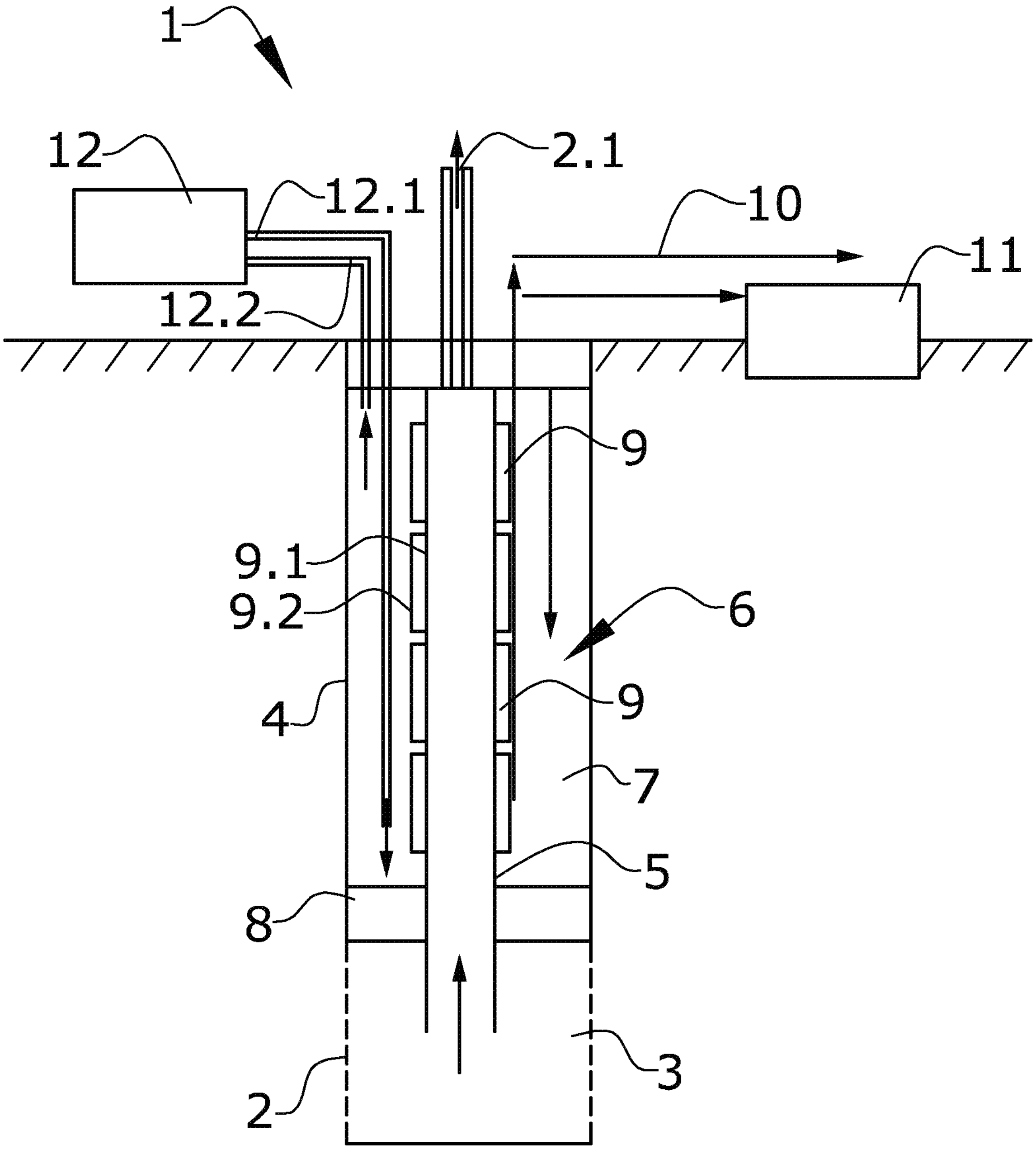
FIG. 1 This figure shows a sectional view of an assembly for generating electricity in a production well of a hot fluid according to an embodiment of the invention.

FIG. 1 shows a first embodiment of an assembly (1) for generating electricity in a production well (2) of a hot fluid (3). The hot fluid (3) being water and/or oil and/or gas located downhole of a pre-drilled production well (2).

The assembly comprises a casing (4) and a production tubing (5). The production tubing (5) is installed inside the casing (4) so that there is a space in between the casing (4) and the production tubing (5). Additionally, the production tubing (5) is adapted to transport the hot fluid (3) from a collecting downhole of the production well (2) to an outer part (2.1) of the production well (2) in respect to the collecting downhole location (not represented). In particular, the outer part (2.1) is the surface towards the hot fluid (3) is extracted.

The assembly also comprises a barrier (8) in between the production tubing (5) and the casing (4) to fluidically separate the inner space (6) and the interior space housed by the casing (4) at a collecting downhole location. The barrier (8) is delimiting the bottom part of the inner space (6) and the surface is delimiting the top part of said inner space (6). In preferred embodiments, the inner space (6) has the shape of a substantially circular hollow cylinder and said inner space (6) is housing a cold fluid (7).

According to the invention, the assembly (1) comprises at least one thermoelectric means (9) having a hot side (9.1) and a cold side (9.2) and located on the outer side of the production tubing (5). The cold side (9.2) is oriented towards the cold fluid (7) of the inner space (6) and the hot side (9.1) is oriented towards the production tubing (5), and thus, towards the hot fluid (3). In particular, the hot side (9.1) is in thermal contact with the hot fluid (3) and the cold side (9.2) is in thermal contact with the cold fluid (7). In some preferred embodiments, the cold side (9.2) of the at least one thermoelectric means (9) is in direct contact with the cold fluid (7).

In the preferred embodiments of FIG. 1, the assembly (1) comprises thermoelectric means (9) covering part of the outside part of the production tubing (5). In some other embodiments, the production tubing (5) is partly covered with thermoelectric means (9) as shown in the embodiment depicted in FIG. 1.

In the embodiments of FIG. 1, the assembly (1) shows four thermoelectric means (9), each thermoelectric means (9) being preferably semi-circular, the sectional view provided by FIG. 1 shows eight rectangular shapes (9) where two rectangular shapes form one and only thermoelectric means (9).

Figure 6:
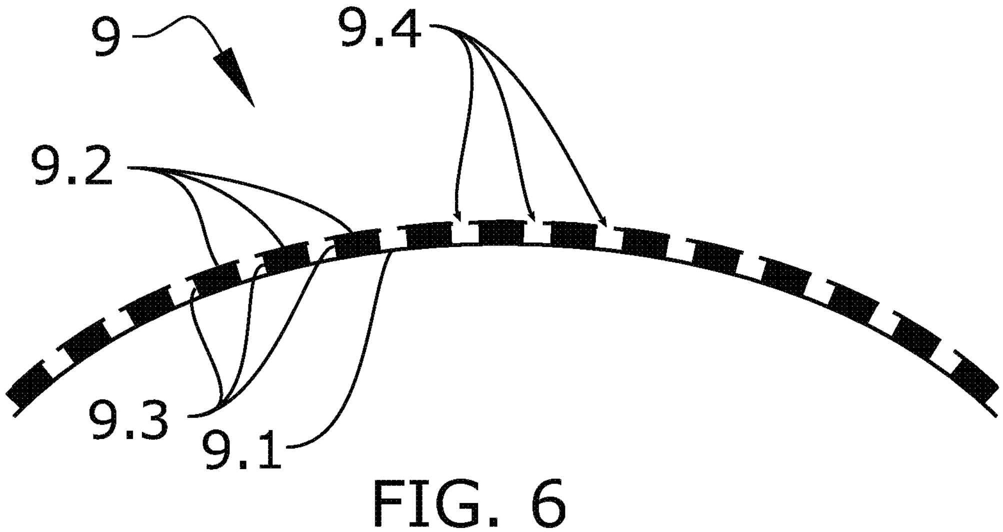
FIG. 6 This figure shows a schematic sectional view of an example of an improved thermoelectric means that can be installed on a non-flat surface.

According to another embodiment shown in FIG. 6 and being applicable to any of the disclosed embodiments, thermoelectric means (9) have a specific structure for an improved thermal behavior.

The thermoelectric means (9) comprise a first side, for example the hot side (9.1), being made of a first flexible sheet, the sheet made of flexible material. Since the thermoelectric semiconductors that allow heat to be converted into electrical energy are rigid, a plurality of independent pieces (9.3) of thermoelectric semiconductors are distributed on the surface of the first flexible sheet.

A second sheet is located over said set of independent pieces (9.3), said second sheet being also being made up of a set of portions of a sheet, either flexible or not, which in this embodiment is the cold side (9.2) of the thermoelectric means (9). Preferably, each portion of the second sheet is located over one independent piece (9.3) of thermoelectric semiconductor. The second sheet is in a second side opposite to the first side. In this embodiment, the second side is the cold side (9.2). In another embodiment, the first side and the second side are interchanged.

Each portion of the set of portions of the second sheet is separated from each other. The separation (9.4) according to the sectional view of FIG. 6 is shown in the upper part of the thermoelectric means (9). The term "upper part" refers to the view of FIG. 6. This separation (9.4) shown according to a horizontal direction also exists according to a direction perpendicular to the plane of the sectional view, resulting in an arrangement of the independent pieces (9.3) in rows and columns.

With this specific configuration of the structure of the thermoelectric means (9), it is possible to configure a device for converting heat into electrical energy that is capable of adapting to surfaces that are not flat, such as the cylindrical surface of the production tube (5). Not only does it adapt to a cylindrical surface, but it also has the ability to adapt to the irregularities of the same surface, improving the thermal contact and, consequently, the performance of the thermoelectric means (9).

A second technical effect that has been found is that the separation of the semiconductor material into a plurality of independent pieces establishes a barrier to heat transport in a direction parallel to the surface of the hot source. This transverse heat flow does not produce electrical energy, so all the heat must flow in the direction perpendicular to the semiconductor, increasing its overall efficiency.

The assembly (1) also comprises an electrical conductor (10) which is connected to each thermoelectric means (9) and transport the generated electricity towards the surface. In some preferred embodiments, the electrical conductor (10) is a cable and said cable is attached to the outer side of the production tubing (5) thanks to at least one anchoring means (not represented in FIG. 1).

In the embodiment of FIG. 1, the assembly (1) further presents control means (11) which are configured for monitoring temperature of the cold fluid (7) and, preferably, part of the control means (11) is in thermal contact with said cold fluid (7).

In the same embodiment of FIG. 1, the assembly (1) also presents cooling means (12) which are configured for maintaining the cold fluid (7) at a temperature lower than the temperature of the hot fluid (3).

Furthermore, the cooling means (12) are connected to a plurality of conducts (12.1, 12.2) thermally connected to the cold fluid (7) and configured for transporting a fluid. In the particular embodiment of FIG. 1, the plurality of conducts (12.1, 12.2) is an open loop. On the one hand, the first conduct (12.1) injects fluid at the bottom of the inner space (6) close to the barrier (8) and, on the other hand, the second conduct (12.2) extracts fluid at the top of inner space (6) close to the surface. Advantageously, this configuration of the plurality of conducts (12.1, 12.2) provides a homogeneous cooling of the cold fluid (7) of the inner space (6).

Preferably, the first conduct (12.1) is longer than the second conduct (12.2) and, since the plurality of conducts (12.1, 12.2) is an open loop, in the particular embodiment of FIG. 1, the fluid transported by the plurality of conducts (12.1, 12.2) is cold fluid (7).

Also in this preferred embodiment, the cooling means (12) comprises a heat exchanger cooler which is preferably located at the surface. The heat exchanger cooler is configured for cooling the fluid of the plurality of conducts (12.1, 12.2) before injecting said fluid in the inner space (6).

In some preferred embodiments, each of the at least one thermoelectric means (9) comprises temperature sensors and/or electrical failure detection (not represented in FIG. 1)

In a preferred embodiment, the thermoelectric means (9) of the invention comprises $Bi_2Te_3$ as a semiconductor. In some other preferred embodiment, the thermoelectric means (9) are based on $Bi_2Te_3$.

In preferred embodiment, the cold fluid (7) of the inner space (6) is water, preferably seawater.

Figure 2:
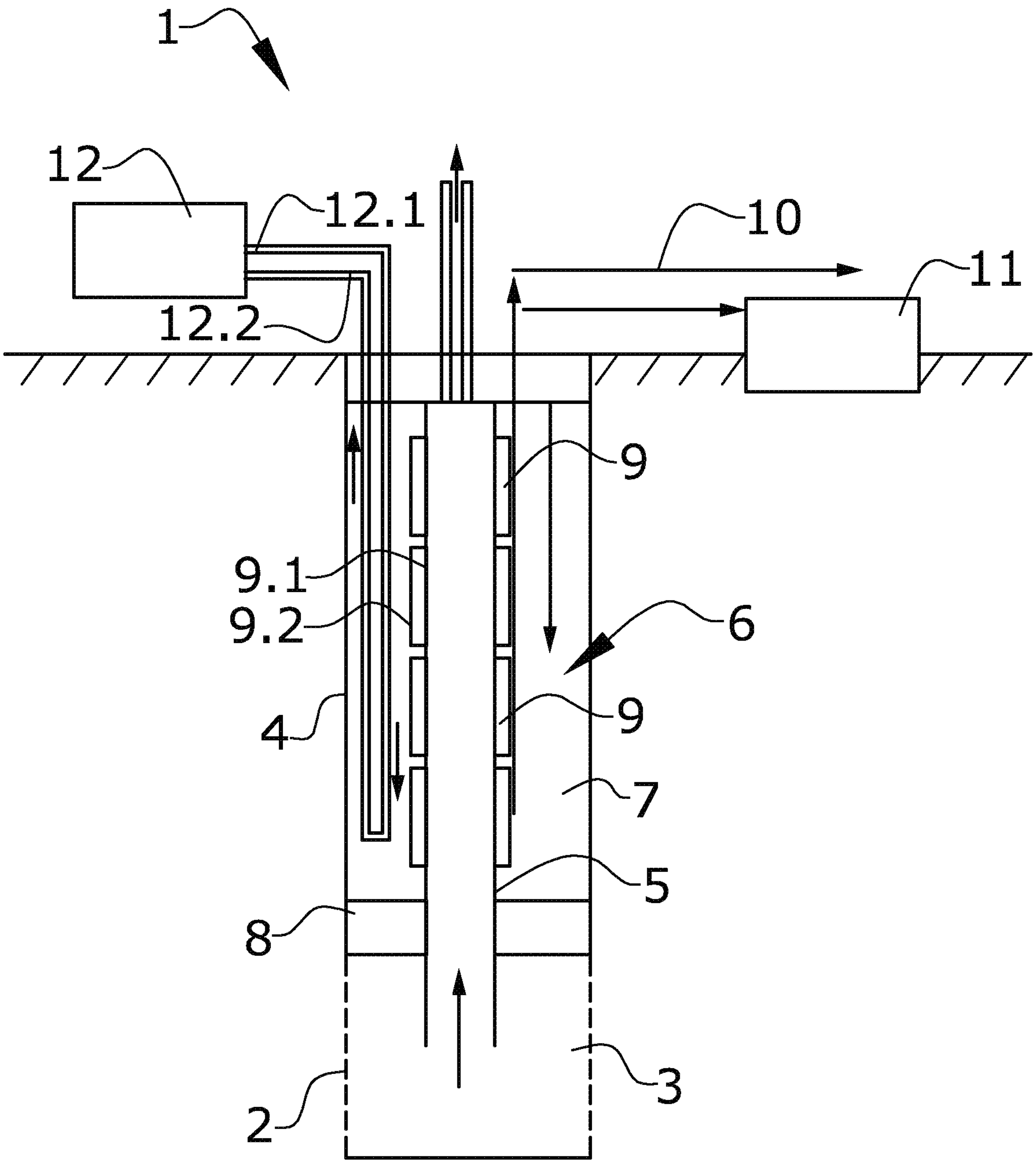
FIG. 2 This figure shows a sectional view of an assembly for generating electricity in a production well of a hot fluid according to an embodiment of the invention.

FIG. 2 depicts another embodiment of the invention wherein, instead of presenting an open loop as shown in FIG. 1, the plurality of conducts (12.1, 12.2) of the cooling means (12) is a closed loop. In the present embodiment, the cooling means (12) also comprises a heat exchanger cooler for cooling the fluid of the plurality of conduct (12.1, 12.2).

In the particular embodiment of the plurality of conducts (12.1, 12.2) being a closed loop, the fluid of the plurality of conducts (12.1, 12.2) and the cold fluid (7) are either the same fluid or different fluids. Particularly, said fluid can be a coolant such as seawater, also called salt water.

In FIG. 2, The first conduct (12.1) of the closed loop is configured for transporting the fluid from the heat exchanger cooler of the cooling means (12) towards the bottom of the inner space (6) and the second conduct (12.2) is configured for transporting the fluid from the bottom of the inner space (6) towards the surface and back to the heat exchanger cooler (12) of the cooling means (12).

Figure 3:
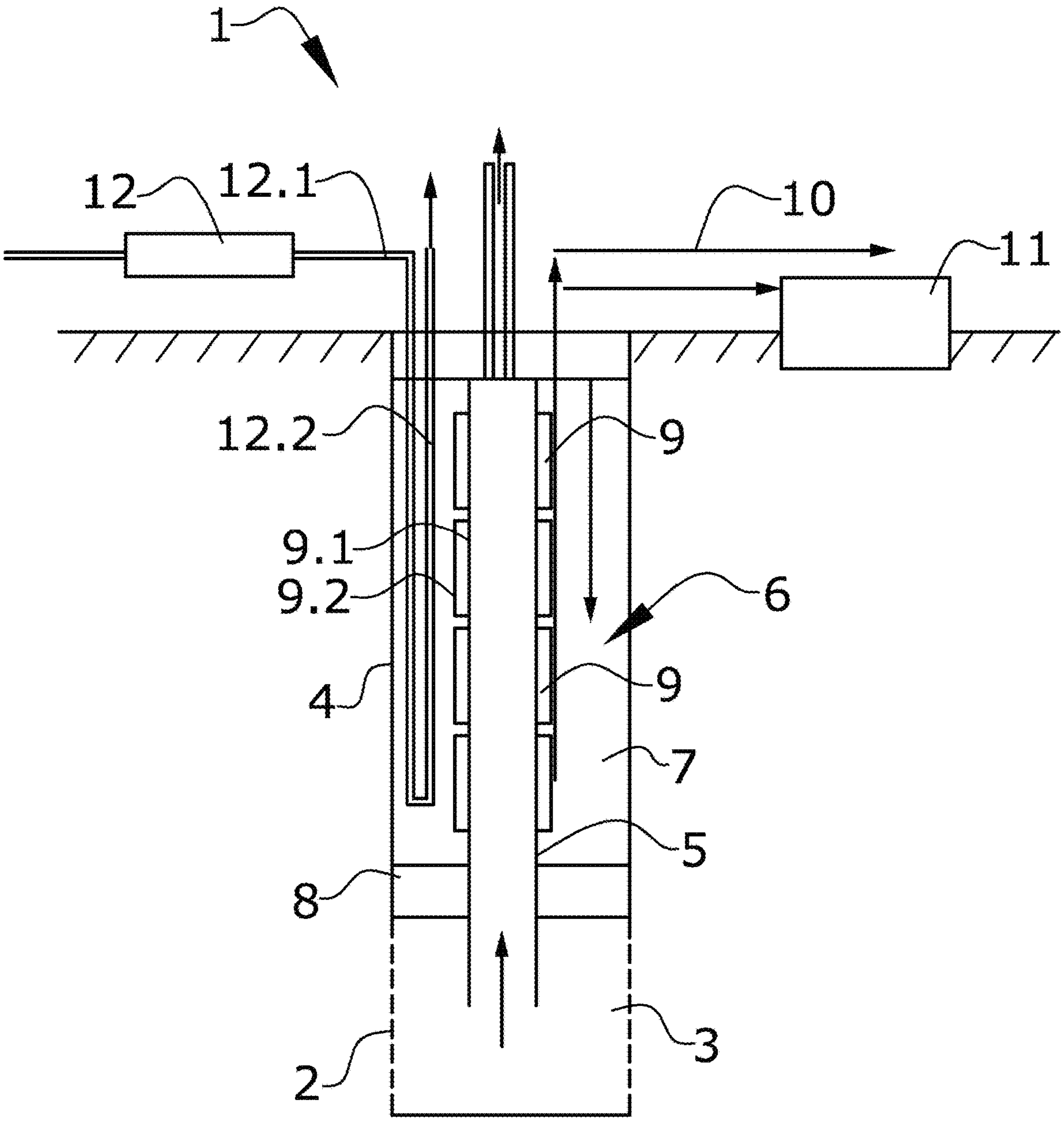
FIG. 3 This figure shows a sectional view of a production tubing of an assembly for generating electricity according to an embodiment of the invention.

Then, in the embodiment depicted in FIG. 3, the assembly (1) of the invention shows cooling means (12) wherein said cooling means (12) comprises a pump. In that particular embodiment, the plurality of conduct (12.1, 12.2) are connected in series and the fluid is injected on a first end of the first conduct (12.1) oriented towards the bottom of the inner space (6). Then, the fluid is pumped, thanks to the cooling means (12), towards the surface, thus, towards the surface where the fluid is released.

Figure 4:
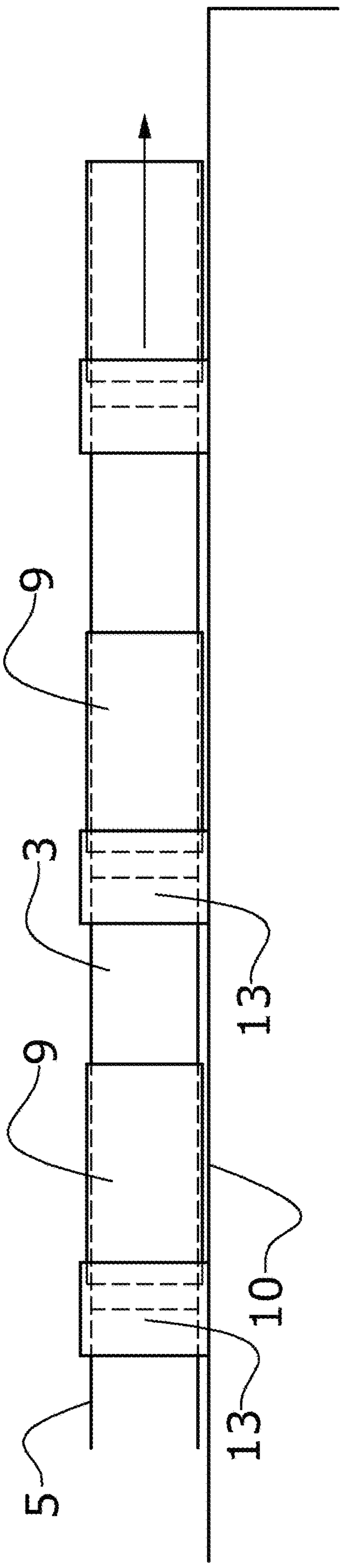
FIG. 4 This figure shows a side view of an assembly for generating electricity in a production well of a hot fluid according to an embodiment of the invention.

FIG. 4 depicts a side view production tubing (5) wherein a hot fluid (3) is transported and the direction of the transport of said hot fluid (3) is shown by the arrow. In this particular embodiment, said part of the production tubing (5) shows three thermoelectric means (9). Each thermoelectric means (9) is attached to the outer site of the production tubing (5) thanks to anchoring means (13). In some preferred embodiments, the anchoring means (13) cover part of the bottom part of the thermoelectric means (9).

Also in some preferred embodiments, the thermoelectric means (9) covers part of the production tubing (5) and, thus, some space are visible in between thermoelectric means (9). In some other preferred embodiments, these spaces can be covered by insulating means (not represented in this Figure) placed on the outer side of the production tubing (5).

In this preferred embodiment, the thermoelectric means (9) can further comprises temperature sensors and/or electrical failure detection sensors (not represented in this Figure).

Figure 5:
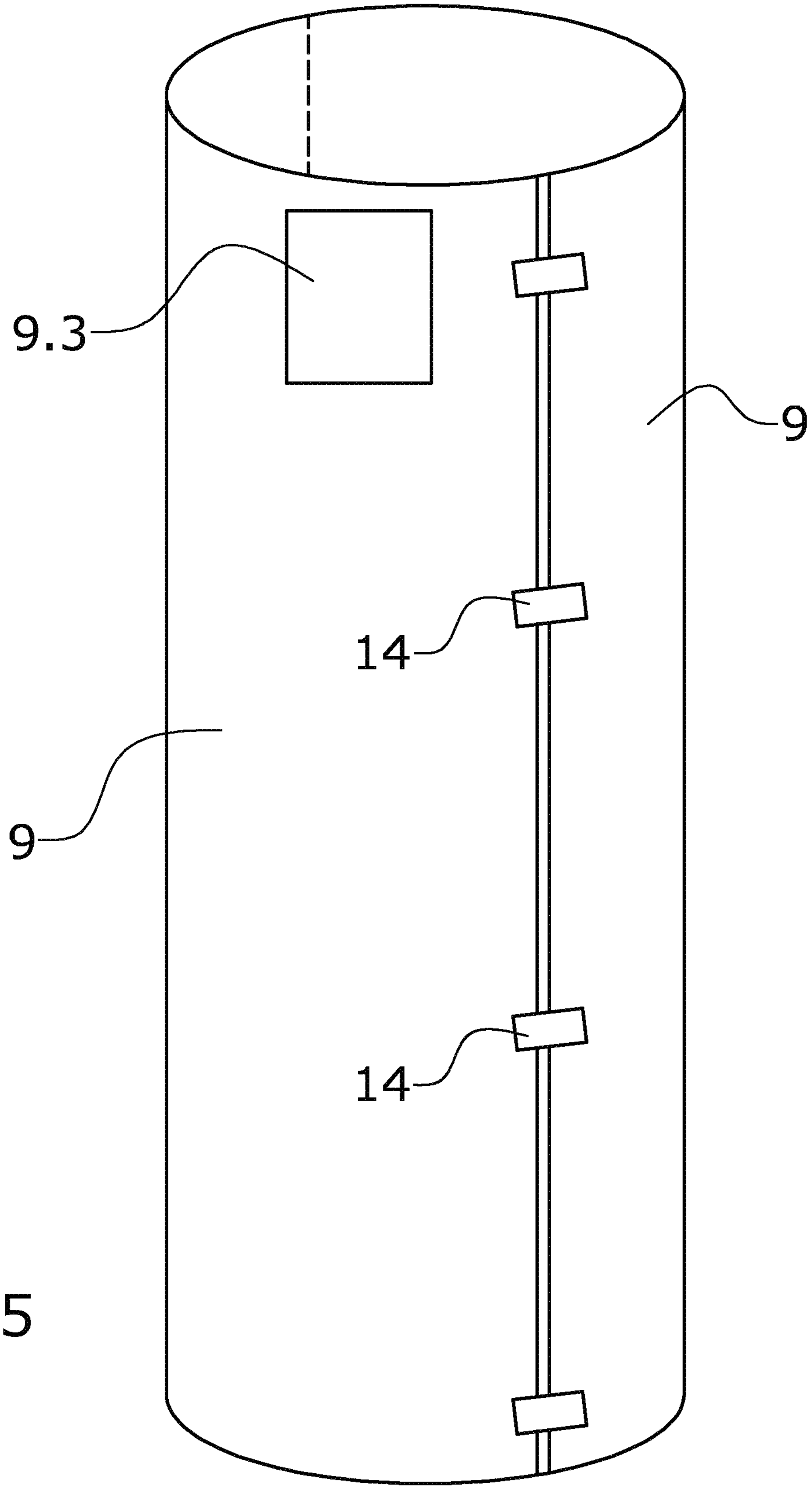
FIG. 5 This figure shows a view of the thermoelectric means according to an embodiment of the invention.

Finally, FIG. 5 shows an embodiment of the thermoelectric means (9) wherein said thermoelectric means (9) present a semicircular shape and wherein two semicircular shape are fastened together in order to present the shape of a tube and be able to be installed over a production tubing (5). Additionally, two semicircular thermoelectric means (9) are fastened together by at least one locking mechanism (14). In the particular embodiment of FIG. 5, the two semicircular thermoelectric means (9) are fastened by four locking mechanism (14).

In preferred embodiments, the thermoelectric means (9) can either be made of relatively flexible film compared to the rigidity of the production tubing (5) or either present a rigidity close to the rigidity of the production tubing (5) as depicted in FIG. 5.

In the embodiment where the thermoelectric means (9) are provided as flexible film, said film is prefabricated at the standard dimension required to fit on the outside of a production tubing (5) and present a locking mechanism (14) in the form of a zipper extending along the whole length of each semicircular thermoelectric means (9). Additionally, in some alternate embodiments, different type of locking mechanism (14) can be used such as glue and/or spring activated straps.

Also, the dimensions of the semicircular thermoelectric means (9) corresponds to the dimension of the outer side of the production tubing (5) in order to provide a tight fit and ease the mounting steps of said thermoelectric means (9).

In the particular embodiment of FIG. 5, the thermoelectric means (9) present temperature sensors and/or electrical failure detection (9.3). Each thermoelectric means (9) is connected to the cable (not represented in this Figure) and comprises at least power outlets, signal and control line. Also, as shown in FIG. 4, the cable is anchored to the production tubing (5) by anchoring means (13) such as cable clamps.

In some other embodiments, the mounting of the thermoelectric means (9) is robotized and synchronized with the running of the completion.

The invention claimed is:

1. An assembly for generating electricity in a production well of a hot fluid, the hot fluid being water and/or oil and/or gas, the production well comprising:

a casing;

a production tubing, comprising an inner side and an outer side, the production tubing:

being housed in the casing;

being adapted to transport hot fluid from a collecting downhole location of the production well to an outer part of the well in respect to the collecting downhole location, and wherein between the production tubing and the casing there is an inner space configured to house a cold fluid;

a barrier between the production tubing and the casing to fluidically separate the inner space and an interior space housed by the casing at a collecting downhole location;

at least one pair of thermoelectric means each comprising a hot side and a cold side;

wherein the at least one pair of thermoelectric means are configured to generate electricity when the hot side is in thermal contact with a hot source and the cold side is in thermal contact with a cold source, the hot side of the at least one pair of thermoelectric means, in operative mode, is thermally connected to the hot fluid transported by the production tubing and the cold side is thermally connected to the cold fluid of the inner space;

an electrical conductor connected to the at least one pair of thermoelectric means for transporting the generated electricity to at least an outer part of the well;

wherein each of the at least one pair of thermoelectric means has a semi cylindrical shape; and at least one locking mechanism configured for fastening the at least one pair of thermoelectric means together, when fastened each of the at least one pair of thermoelectric means encircle the production tubing, and the at least one pair of thermoelectric means are configured to be installed in pairs as the production tubing is installed in the production well, wherein the production tubing is fully covered by the at least one pair of thermoelectric means.

2. The assembly according to claim 1, wherein the assembly further comprises control means configured for monitoring temperature of the cold fluid, and cooling means configured for maintaining the cold fluid at a temperature lower than the temperature of the hot fluid wherein the cooling means comprise a plurality of conducts thermally connected to the cold fluid and configured for transporting a fluid.

3. The assembly according to claim 2, wherein the fluid transported by the plurality of conducts is cold fluid.

4. The assembly according to claim 3, wherein the plurality of conducts of the cooling means is an open loop adapted to inject cold fluid to the bottom of the inner space and extract cold fluid at the top of the inner space.

5. The assembly according to claim 2, wherein the plurality of conducts of the cooling means is a closed loop adapted to transport a fluid.

6. The assembly according to claim 2, wherein the cooling means comprises a pump.

7. The assembly according to claim 1, wherein the assembly further comprises at least one anchoring means configured to attach the electrical conductor to the outer side of the production tubing.

8. The assembly according to claim 1, wherein the at least one pair of thermoelectric means comprises temperature sensors and/or electrical failure detection sensors.

9. The assembly according to claim 1, wherein the assembly further comprises insulating means located on the outer side of the production tubing in between the at least one pair of thermoelectric means.

10. The assembly according to claim 1, wherein the at least one pair of thermoelectric means comprises:

a first sheet of flexible material;

a plurality of independent pieces of thermoelectric semiconductor, each piece being in thermal contact with the first flexible sheet and distributed on the surface of the first flexible sheet;

a second sheet arranged over the set of independent pieces of thermoelectric semiconductor, the second sheet being made up of a set of portions, each portion of the second sheet being located in one side of each independent piece of thermoelectric semiconductor, the side opposite to the side in thermal contact with the first sheet.

11. The assembly according to claim 1, wherein the temperature of the hot fluid is greater than the temperature of the cold fluid.

12. The assembly according to claim 1, wherein the at least one pair of thermoelectric means comprises $Bi_2Te_3$ as a semiconductor.

13. The assembly according to claim 1, wherein the cold fluid is water.

14. An assembly for generating electricity in a production well of a hot fluid, the hot fluid being water and/or oil and/or gas, the production well comprising:

a casing;

a production tubing, comprising an inner side and an outer side, the production tubing:

being housed in the casing;

being adapted to transport hot fluid from a collecting downhole location of the production well to an outer part of the well in respect to the collecting downhole location, and wherein between the production tubing and the casing there is an inner space configured to house a cold fluid;

a barrier between the production tubing and the casing to fluidically separate the inner space and an interior space housed by the casing at a collecting downhole location;

at least one pair of thermoelectric means each comprising a hot side and a cold side;

wherein the at least one pair of thermoelectric means are configured to generate electricity when the hot side is in thermal contact with a hot source and the cold side is in thermal contact with a cold source, the hot side of the at least one pair of thermoelectric means, in operative mode, is thermally connected to the hot fluid transported by the production tubing and the cold side is thermally connected to the cold fluid of the inner space;

an electrical conductor connected to the at least one pair of thermoelectric means for transporting the generated electricity to at least an outer part of the well;

wherein each of the at least one pair of thermoelectric means has a semi cylindrical shape;

at least one locking mechanism configured for fastening the at least one pair of thermoelectric means together, when fastened each of the at least one pair of thermoelectric means encircle the production tubing, and the at least one pair of thermoelectric means are configured to be installed in pairs as the production tubing is installed in the production well; and control means configured for monitoring temperature of the cold fluid, and cooling means configured for maintaining the cold fluid at a temperature lower than the temperature of the hot fluid wherein the cooling means comprise a plurality of conducts thermally connected to the cold fluid and configured for transporting a fluid, wherein the fluid transported by the plurality of conducts is cold fluid, and wherein the fluid of the plurality of conducts and the cold fluid of the inner space are different fluids.

15. The assembly according to claim 14, wherein the cooling means comprises a heat exchanger cooler configured for cooling the fluid of the plurality of conducts before injecting said fluid in the plurality of conducts.

16. The assembly according to claim 14, wherein the production tubing is partly covered by the at least one pair of thermoelectric means.

17. The assembly according to claim 14, wherein the production tubing is fully covered by the at least one pair of thermoelectric means.

18. A method for generating electricity in a production well of a hot fluid, the method comprising:

a) providing an assembly for generating electricity comprising:

a casing;

a production tubing, comprising an inner side and an outer side, the production tubing:

being housed in the casing;

being adapted to transport hot fluid from a collecting downhole location of the production well to an outer part of the well in respect to the collecting downhole location, and wherein between the production tubing and the casing there is an inner space configured to house a cold fluid;

a barrier between the production tubing and the casing to fluidically separate the inner space and an interior space housed by the casing at a collecting downhole location;

at least one pair of thermoelectric means comprising a hot side and a cold side, wherein the at least one pair of thermoelectric means are configured to generate electricity when the hot side is in thermal contact with a hot source and the cold side is in thermal contact with a cold source, the hot side of the at least one thermoelectric thermoelectric means, in operative mode, is thermally connected to the hot fluid transported by the production tubing and the cold side is thermally connected to the cold fluid of the inner space, an electrical conductor connected to the at least one pair of thermoelectric means for transporting the generated electricity to at least an outer part of the well, wherein each of the at least one pair of thermoelectric means has a semi cylindrical shape; and at least one locking mechanism configured for fastening the at least one pair of thermoelectric means together and when fastened together each pair of thermoelectric means encircles the production tubing, b) mounting said assembly for generating electricity in a production well of a hot fluid comprising a casing previously installed, including fastening the at least one pair of thermoelectric means around the production tubing using the at least one locking mechanism, wherein the production tubing is fully covered by the at least one pair of thermoelectric means.

19. The method for generating electricity according to claim 18, wherein the method further comprises the step of installing, if not present, a casing and a production tubing being housed in the casing wherein the production tubing is extended at least along a path portion of the casing and the at least one pair of thermoelectric means is installed around the production tubing as the production tubing is extended at least along a path portion of the casing.

20. The method for generating electricity according to claim 18, wherein mounting of the at least one pair of thermoelectric means is robotized.

21. The method according to claim 1, wherein the production tubing is a standard production well production tubing.

* * * * *